(12) United States Patent
Homner (10) Patent No.: US 7,658,583 B2
(45) Date of Patent: Feb. 9, 2010

(54) CONNECTION ARRANGEMENT FOR SUPERIMPOSED LAYERS OF MATERIAL

(75) Inventor: Bernhard Homner, Calw-Stammheim (DE)

(73) Assignee: S-Fasteners GmbH, Magstadt (DE)

( * ) Notice: Subject to any disclaimer, the term of this patent is extended or adjusted under 35 U.S.C. 154(b) by 460 days.

(21) Appl. No.: 11/636,180

(22) Filed: Dec. 9, 2006

(65) Prior Publication Data

US 2007/0147975 A1 Jun. 28, 2007

(30) Foreign Application Priority Data

Dec. 27, 2005 (DE) .................. 20 2005 020 309 U (51) Int. Cl.
*F16B 19/00* (2006.01)

(52) U.S. Cl. ...................... 411/902; 411/510

(58) Field of Classification Search ................ 411/510, 411/903, 913; 40/27, 299.1, 300, 301, 302, 40/303

See application file for complete search history.

(56) References Cited

U.S. PATENT DOCUMENTS

| | | |
|---|---|---|
| 309,181 A | 12/1884 | Woodrich |
| 1,093,637 A | 4/1914 | Lint |
| 3,266,831 A | 8/1966 | Banse |
| 3,571,977 A | 3/1971 | Abeel |
| 4,495,380 A * | 1/1985 | Ryan et al. ............. 174/138 D |
| 4,686,783 A * | 8/1987 | Bourquard et al. ........... 40/304 |
| 4,805,366 A * | 2/1989 | Long ....................... 52/309.11 |
| 4,987,714 A * | 1/1991 | Lemke ........................ 52/410 |
| 5,036,674 A * | 8/1991 | Chang ........................... 62/77 |
| 5,217,339 A | 6/1993 | O'Connor |
| 5,308,205 A * | 5/1994 | Lautenschlager .......... 411/182 |
| 5,426,905 A * | 6/1995 | Rollhauser et al. ........... 52/512 |
| 5,529,369 A | 6/1996 | Welborn |
| 5,626,450 A * | 5/1997 | Ferrari et al. .............. 411/510 |
| 5,655,801 A | 8/1997 | Casey |
| 5,782,511 A | 7/1998 | Schwarz |

(Continued)

FOREIGN PATENT DOCUMENTS

DE 1860948 U 10/1962

(Continued)

OTHER PUBLICATIONS

U.S. Appl. No. 11/950,643, Homner.

(Continued)

*Primary Examiner*—Gary Estremsky
(74) *Attorney, Agent, or Firm*—Woodling, Krost and Rust (57) ABSTRACT

In aircraft construction, connection elements for connecting layers of insulating material onto walls are subject to special requirements for ease of installation, weight considerations, and resistance to heat. The invention provides a connection arrangement, in particular for superimposed layers of material, whose function is not impaired under extreme heat. The connection arrangement is comprised by a pin with a head or head arrangement, engaging positions, and a retaining element. The pin, the head or the head arrangement, and retaining element are made up of a skeleton and an outer material where the skeleton is made of a material more resistant to heat than the outer material. Following destruction or removal of the outer material by heat, the remaining skeleton parts of the pin, head part, and retaining element maintain their connections and structure keeping the layers of material in place.

19 Claims, 8 Drawing Sheets

U.S. PATENT DOCUMENTS

| | | | |
|---|---|---|---|
| 6,149,210 A | 11/2000 | Hunt | |
| 6,409,446 B1 | 6/2002 | Schwarz | |
| 6,442,806 B1 | 9/2002 | Wesson | |
| 6,443,679 B1 | 9/2002 | Schwarz | |
| 6,497,436 B1 | 12/2002 | Deblock | |
| 6,679,530 B2 | 1/2004 | Krynski | |
| 6,736,438 B1 | 5/2004 | Wieclawski | |
| 6,837,661 B2 | 1/2005 | Schwarz et al. | |
| 6,846,125 B2 * | 1/2005 | Smith et al. | 403/291 |
| 6,866,227 B2 | 3/2005 | Pratt | |
| 6,908,144 B2 * | 6/2005 | Gotzinger et al. | 296/187.05 |
| 7,107,697 B2 | 9/2006 | Schwarz et al. | |
| 7,179,039 B2 | 2/2007 | SCHWARZ et al | |
| 7,234,209 B2 * | 6/2007 | Totani et al. | 24/607 |
| 2002/0017009 A1 * | 2/2002 | Smith et al. | 24/295 |
| 2004/0115030 A1 | 6/2004 | Schwarz | |
| 2004/0240933 A1 | 12/2004 | Schwarz et al. | |
| 2007/0158955 A1 | 7/2007 | Homner | |

FOREIGN PATENT DOCUMENTS

| | | |
|---|---|---|
| DE | 3145155 A1 | 11/1981 |
| DE | 8710288 U1 | 10/1987 |
| DE | 3623311 A1 | 1/1988 |
| DE | 3922025 C1 | 9/1990 |
| DE | 4239908 C1 | 3/1994 |
| DE | 19707634 A1 | 10/1997 |
| DE | 29808914 U1 | 9/1998 |
| DE | 29914145 U1 | 12/2000 |
| DE | 10040410 A1 | 1/2001 |
| DE | 19943083 A1 | 12/2001 |
| DE | 20218302 U1 | 3/2003 |
| DE | 10355780 A1 | 6/2005 |
| DE | 102004011183 A1 | 9/2005 |
| DE | 102006008655 A1 | 9/2006 |
| DE | 202006019165.8 | 8/2007 |
| DE | 202007000112.6 | 8/2007 |
| EP | 0189569 B1 | 2/1989 |
| EP | 0784141 A1 | 7/1997 |
| EP | 06026133 | 3/2007 |
| EP | 07004742 | 5/2007 |
| EP | 07024364 | 6/2008 |
| EP | 07024365 | 6/2008 |
| GB | 1268022 | 3/1972 |
| GB | 1506902 | 4/1978 |
| GB | 2050487 A | 1/1981 |
| GB | 2219342 A | 12/1989 |
| JP | 2000310210 A | 7/2000 |
| WO | 80/00162 A1 | 2/1980 |

OTHER PUBLICATIONS

U.S. Appl. No. 11/950,630, Homner.

U.S. Appl. No. 11/682,099, Homner.

* cited by examiner

CONNECTION ARRANGEMENT FOR SUPERIMPOSED LAYERS OF MATERIAL

The invention refers to a connection arrangement especially for superimposed layers of material. In many cases, walls (for example) are fitted with layers of insulating material on one or both sides. There are different means of fixing these in position, e.g. the insulating layers can be bonded with adhesive or attached by means of pins or screws. In aircraft construction connection elements of this kind are subject to special requirements e.g. with regard to ease of installation, weight and resistance to heat. Connection elements of plastic do not fulfil such high requirements of heat resistance because plastic either melts or burns when subjected to heat.

In order to avoid this disadvantage, the purpose of the invention is to provide a connection arrangement, in particular for superimposed layers of material, whose function is not impaired under extreme heat, even when the plastic melts or burns.

This purpose of the invention is fulfilled by the properties stated in the characterising section of the claims 1, 2, 15 and 16. Advantageous modifications of the invention are described in the sub-claims.

Adaptations of the invention are shown in the drawings and are described in more detail below.

FIG. 1A

A diagram of the connection arrangement according to invention for two layers of material, consisting of a suitably shaped pin with head and a retaining disk which can be connected in an engaging position to the end of the pin.

FIG. 1B

A perspective view of the pin according to invention as in FIG. 1A.

FIG. 1C

A section view of the pin according to FIG. 1B, section plane E, direction of view A.

FIG. 2A

A section view of three material layers and a connection arrangement according to invention consisting of a suitably shaped pin, each of whose ends can be connected to a retaining disk.

FIG. 2B

A perspective view of the pin according to FIG. 3A.

FIG. 2C

A perspective view of the metal skeleton of the pin according to FIG. 3A.

FIG. 3A

A perspective view of the connection arrangement according to invention with an arrangement of its head part which may be used for attaching, holding or storing of objects or components.

FIG. 3B

A perspective view of the metal skeleton of the pin and the head-part arrangement.

FIG. 4A

A perspective view of the retaining disk of the connection arrangement according to invention.

FIG. 4B

A perspective view of the metal skeleton of the retaining disk according to FIG. 4A.

Figure 1A:
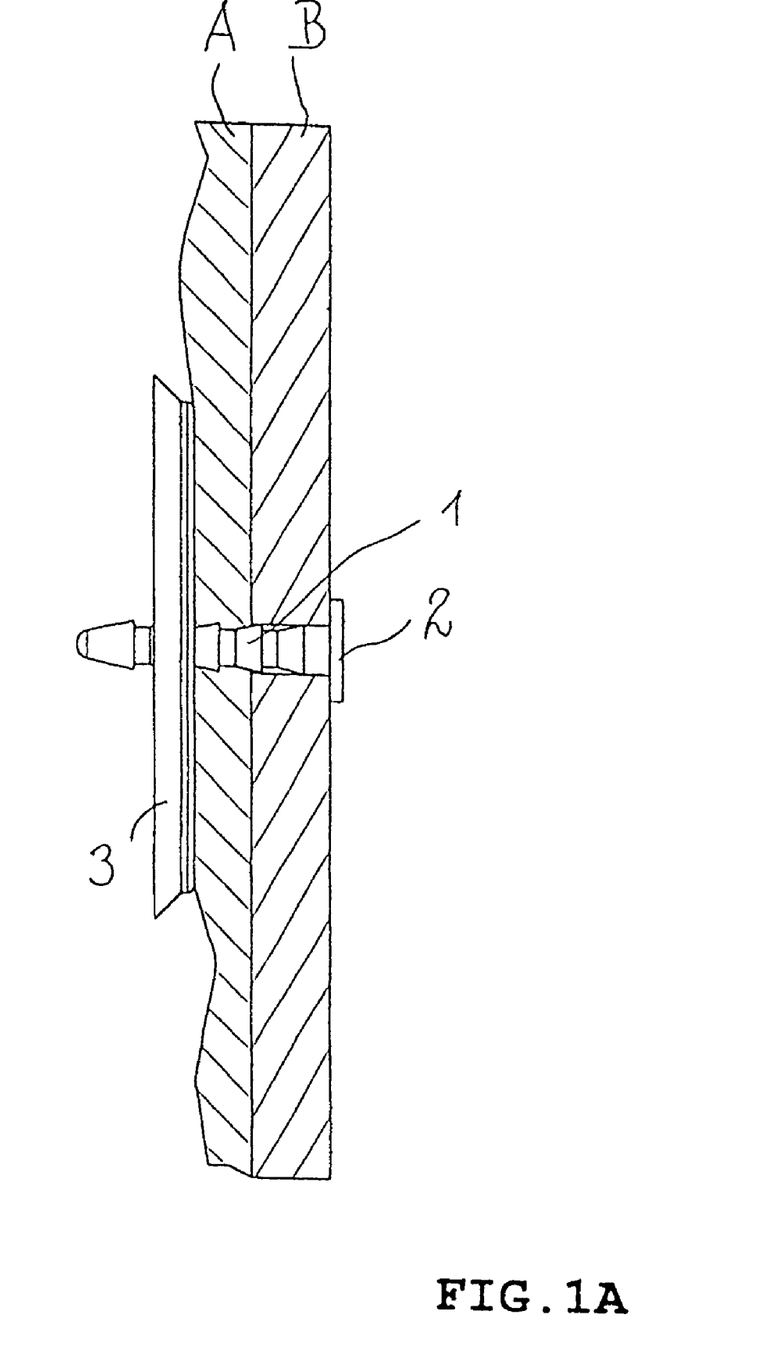

FIG. 1A shows a diagram of the connection arrangement according to invention for two layers of material A and B, consisting of a suitably shaped pin 1 with head 2 and a retaining disk 3 which can be connected in an engaging position s1, s2, s3, s4 (see FIG. 1B) to the end of the pin.

Figure 1B:
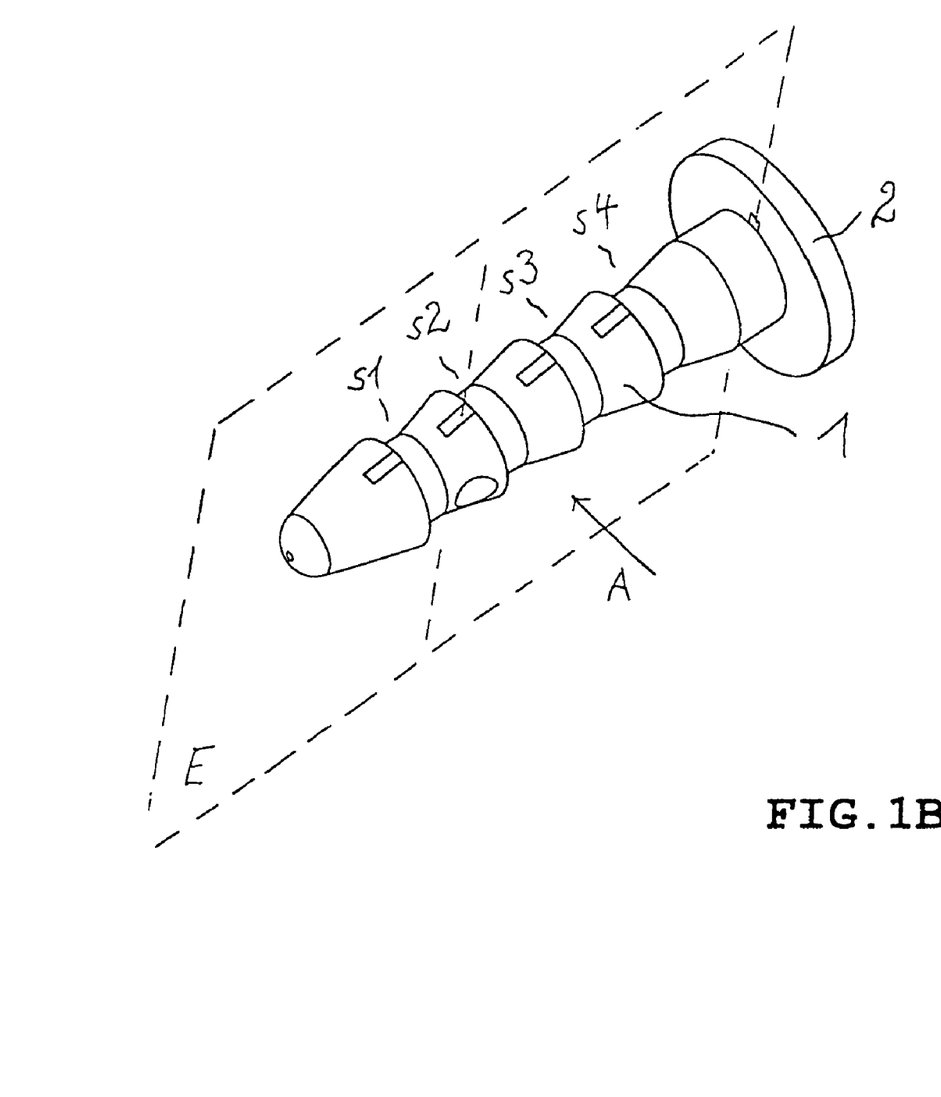
Figure 1C:
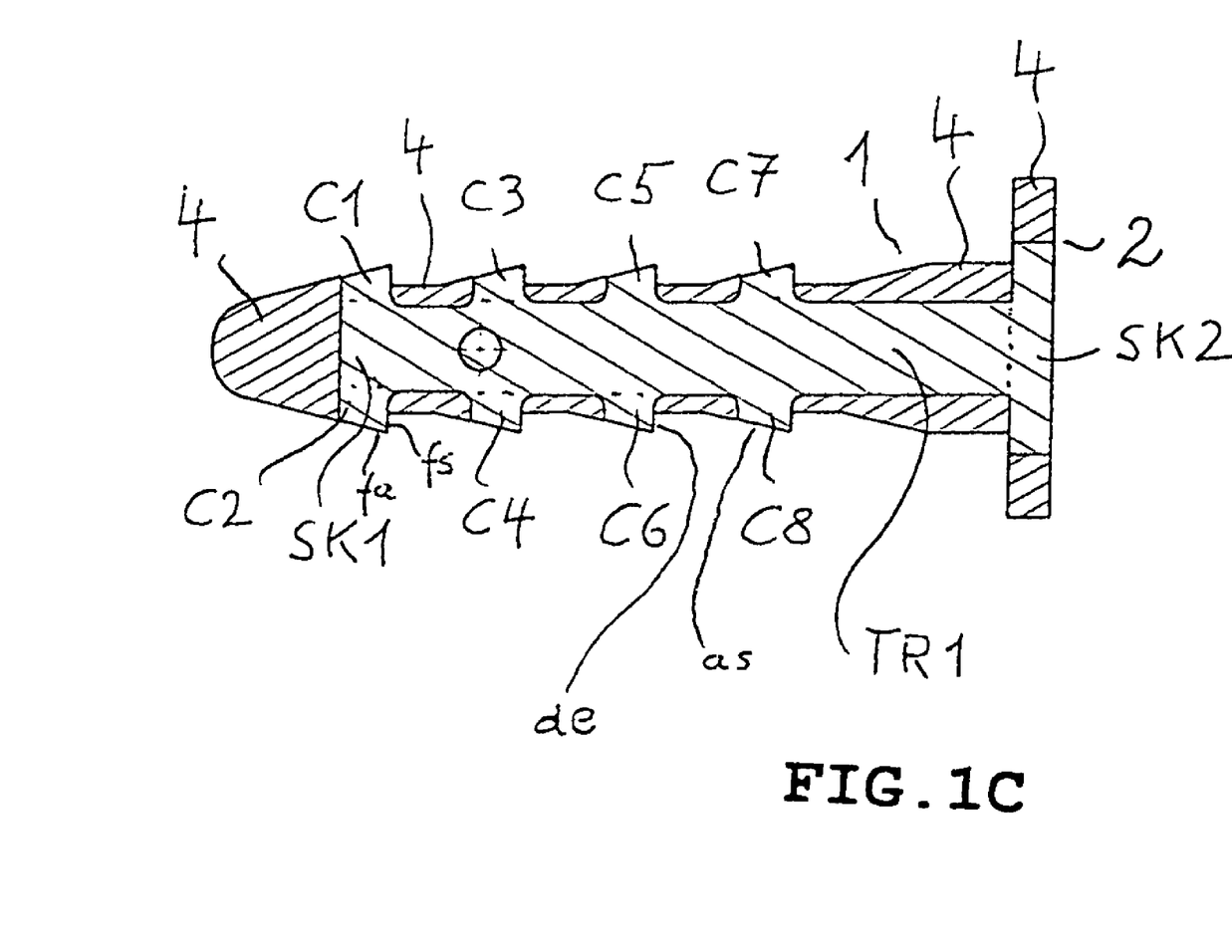

FIG. 1B shows a perspective view of the pin according to invention as in FIG. 1A and FIG. 1C a section view of the pin 1 according to section plane E, direction of view A in FIG. 1B.

The pin passes through a hole in the material layer B and is simply pressed through the "softer" layer of insulating material A.

Figure 4A:
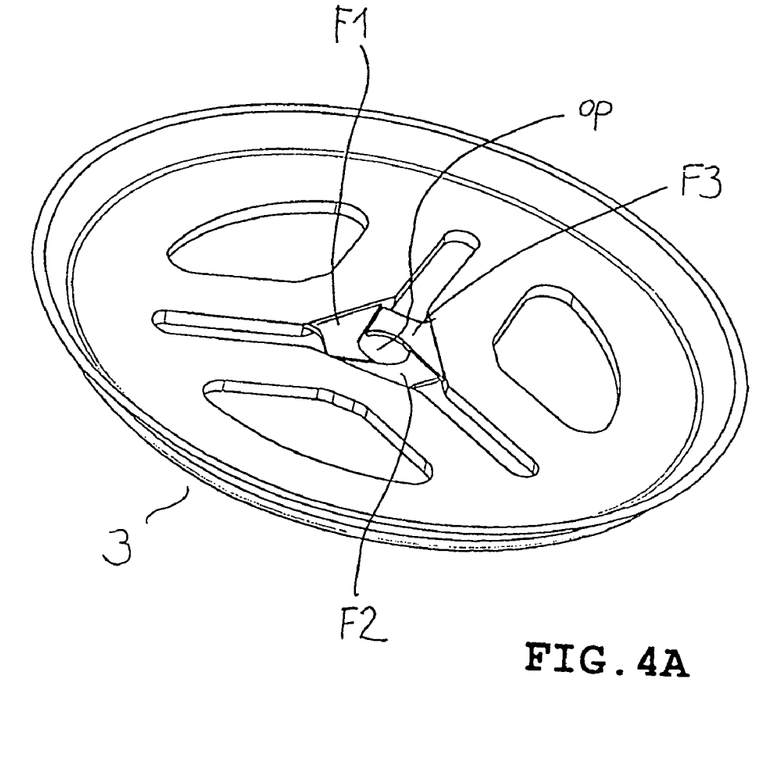
Figure 4B:
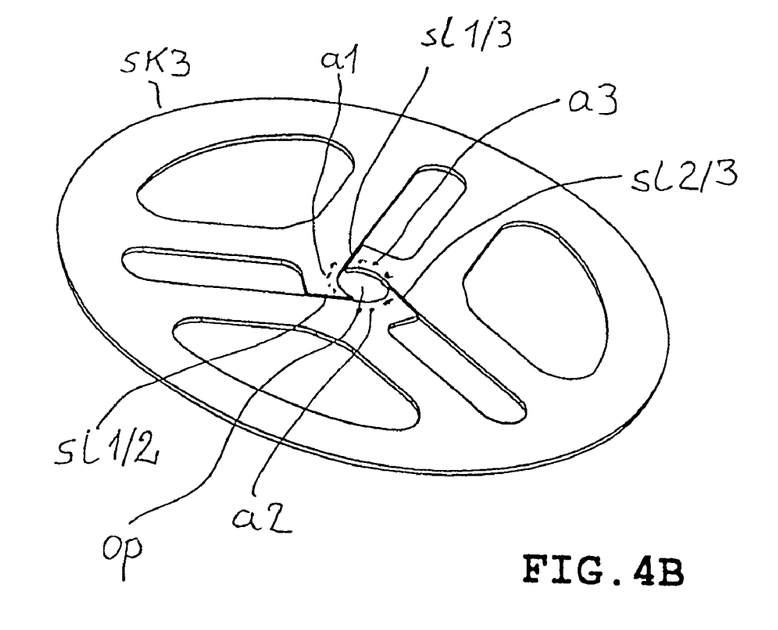

As shown in FIG. 1B and FIG. 1C, pin 1 has concentrically groove-shaped engaging positions s1, s2, s3 and s4 for receiving a retaining disk 3 which is described in more detail for FIGS. 4A and 4B.

The retaining disk 3 is pushed onto the pin 1 until it locks into one of the engaging positions. The two superimposed layers of material A, B are arranged between the head 2 of pin 1 and the retaining disk. If the pin, head and retaining disk were only made of plastic, which melts or burns in extreme heat, the layers of material would no longer be joined in case of fire. For this reason, the pin 1, head 2 and retaining disk 3 according to invention have a metal skeleton SK1, SK2 and SK3, which, in special design, is coated with plastic 4. Should the plastic be destroyed by heat, the cooperating skeleton parts maintain the connection between the material layers A and B. These remain located on the pin skeleton SK1 between the head skeleton SK2 and the retaining-disk skeleton SK3.

The pin skeleton SK1 and the head skeleton SK2 (see FIG. 1C) can be manufactured as one flat stamping. The pin skeleton has a continuous skeleton shaft with rungs C1, C2; C3, C4; C5, C6; C7, C8 which project laterally directly opposite one another. The engaging positions s1, s2, s3 and s4 are formed between the ends of the rungs (see FIGS. 1B and 1C).

In lengthwise section (FIG. 1C) pin 1 has an outer contour similar to a saw tooth. The engaging positions are formed by the gaps between the teeth which may have a horizontal bottom. The outer "saw-tooth" contour is formed by tooth flanks (as) rising in direction of the head 2 and tooth flanks (de) falling towards the axis of the pin (preferably vertically).

Head 2 and retaining disk 3 do not have to be coated with plastic. However, to facilitate handling (avoidance of sharp edges) and installation (collar edge for retaining disk) coating with plastic may be more favourable.

Figure 2A:
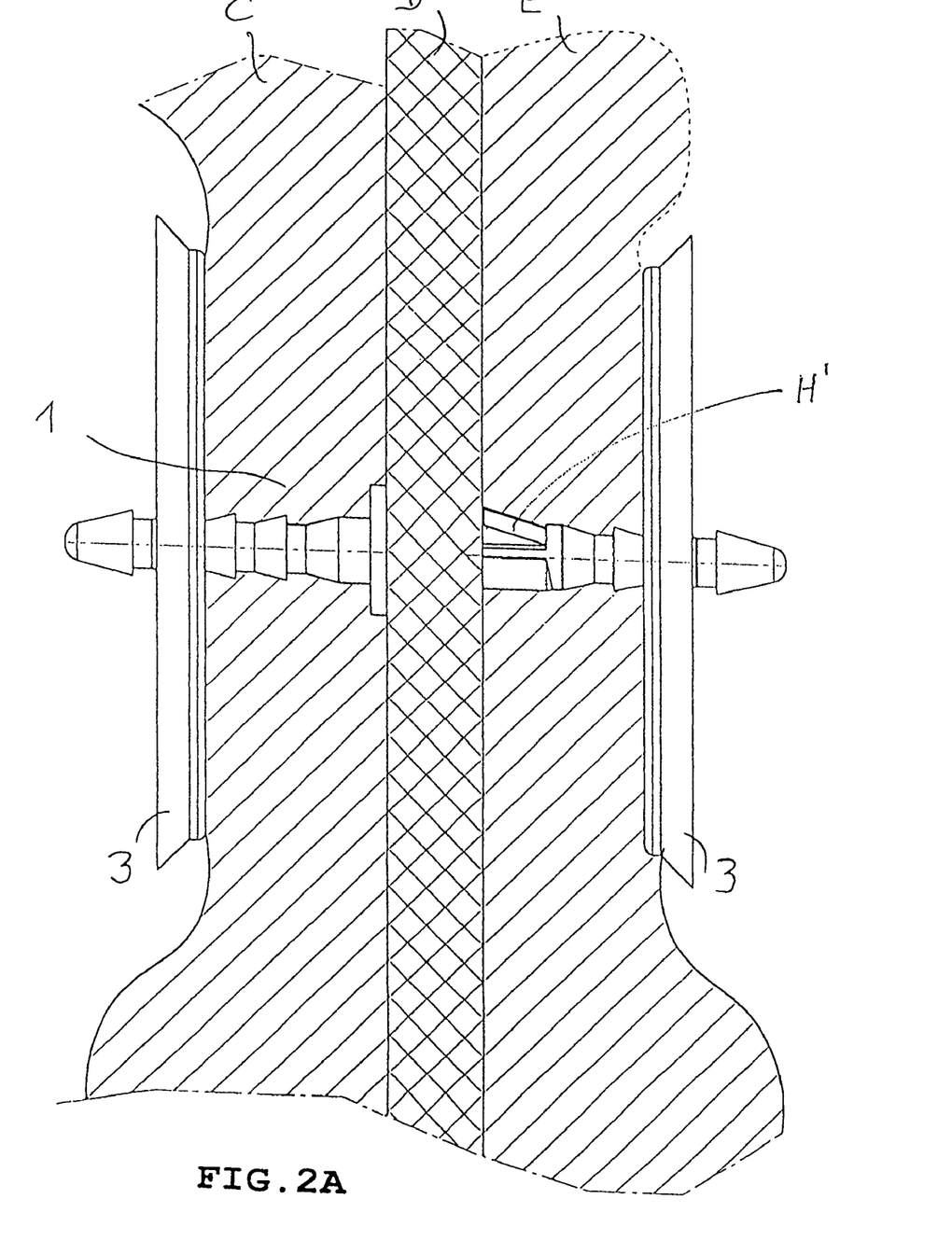
Figure 2B:
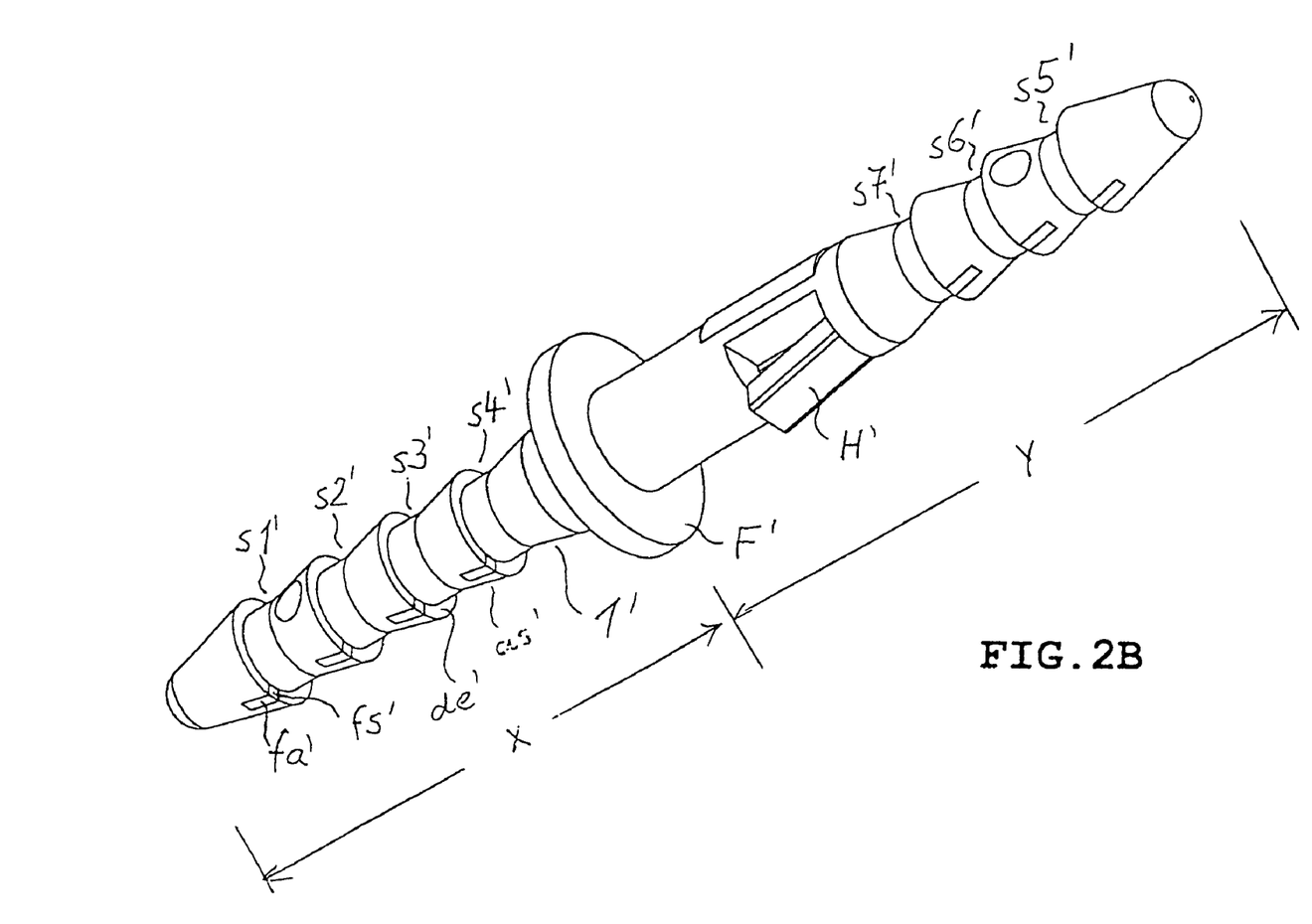
Figure 2C:
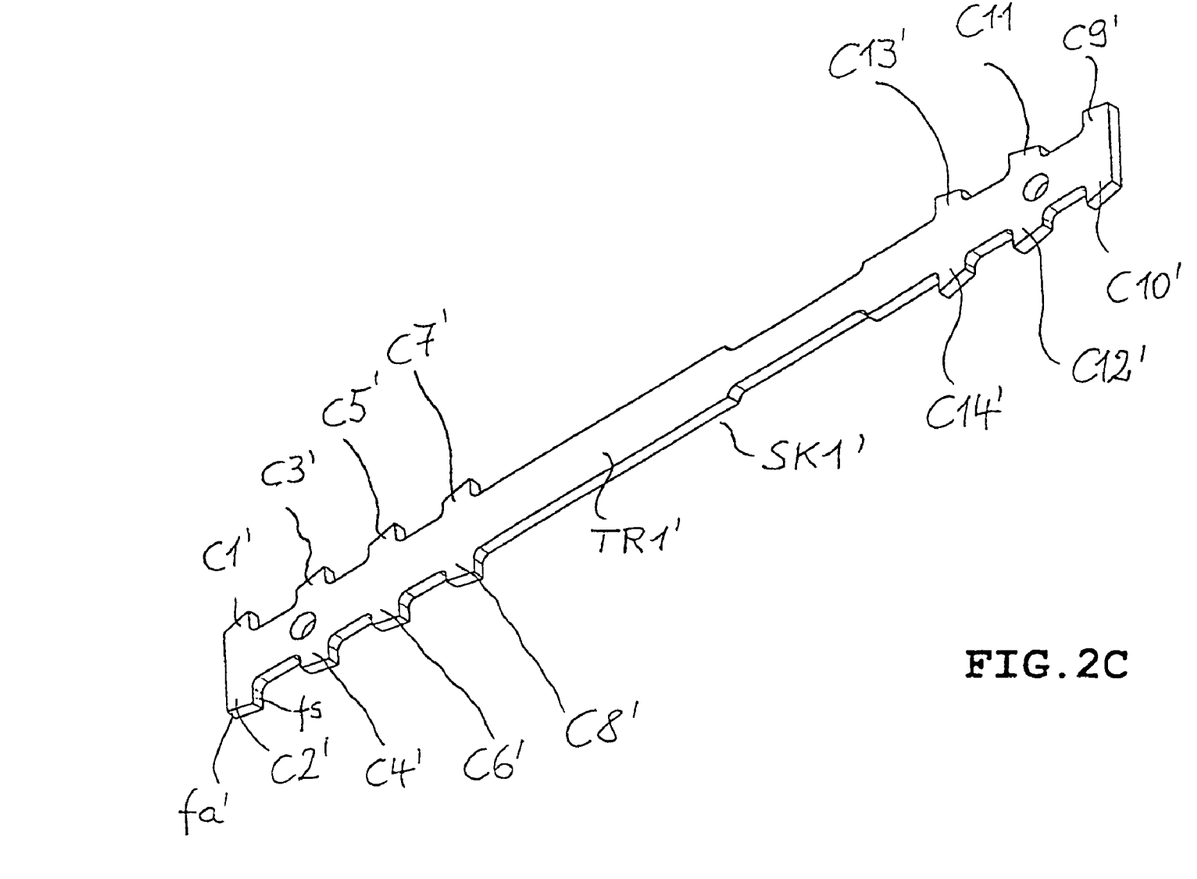

FIGS. 2A, 2B and 2C refer to a specially shaped pin 1' for holding three layers of material C, D and E together.

The material layers C and E may be, for example, of material through which the pin can easily be pushed, as is the case with "soft" damping or insulating boards. In material D, which cannot be penetrated so easily by the pin, a hole should be provided through which the pin can pass.

FIG. 2A shows a section view of three material layers C, D and E placed on top of or against one another. These are held together by a pin 1', at whose ends engaging positions are formed for receiving one retaining disk 3 each. The pin and the retaining disks contain metallic skeleton elements which are coated with plastic.

FIG. 2B shows a perspective view of the pin 1' and

FIG. 2C a perspective view of the metal skeleton of the pin SK1'.

Layers of softer material C and E are located on either side of the harder layer of material D.

At both its ends, the pin 1' has concentrically arranged groove-shaped engaging positions s1', s2', s3', s4' and s5', s6', s7' with a saw-tooth shaped outer contour in an imaginary sectional view.

The outer "saw-tooth" contour is formed by tooth flanks (as') rising in direction of the flange F' and tooth flanks (de') falling towards the axis of the pin (preferably vertically).

The flange F' divides the pin into two parts x and y. Details of the retaining disks 3 at both ends of the pin are given in connection with FIG. 4A and FIG. 4B. The layer of stronger material D is located to the right of the flange F'. It is held in position by a supporting element H' projecting obliquely from the pin.

All three layers of material, C, D and E, are held together by the retaining disks 3 which are pushed from the ends of the pin into the corresponding engaging positions.

The pin 1' comprises a pin skeleton SK1' of metal (preferably steel) consisting of a main shaft with rungs C1', C2'; C3', C4'; C5', C6'; C7', C8' and C9', C10', C11', C12', C13', C14' projecting laterally at equal intervals. The engaging positions s1', s2' etc. are formed between the ends of the rungs in pin 1' (see FIG. 2B). The pin skeleton is preferably a flat stamping. It is coated with plastic to form the shape shown in FIG. 2B either by moulding or injection moulding.

By comparing FIG. 2C with FIG. 2B (or FIG. 1B with FIG. 1C) it can be seen that the purpose of the plastic coating of the pin skeleton SK1 is not only to give the skeleton an even surface. The coating takes place in a die and transforms the flat pin skeleton SK1' (SK1) into a pin-shaped body with concentric indentations which form the engaging positions.

The plastic coating does not have to cover all the surfaces of the skeleton. Surfaces fa' and fs' at the end of the rungs may remain uncovered in order to ensure that defined engaging positions remain fixed. However, the ability of the connection arrangement to function is maintained when these surfaces fa' and fs' receive only a very thin layer of plastic. The thickness of the layer must be such that the connection of the skeleton parts is retained if the layer is destroyed by fire.

Figure 3A:
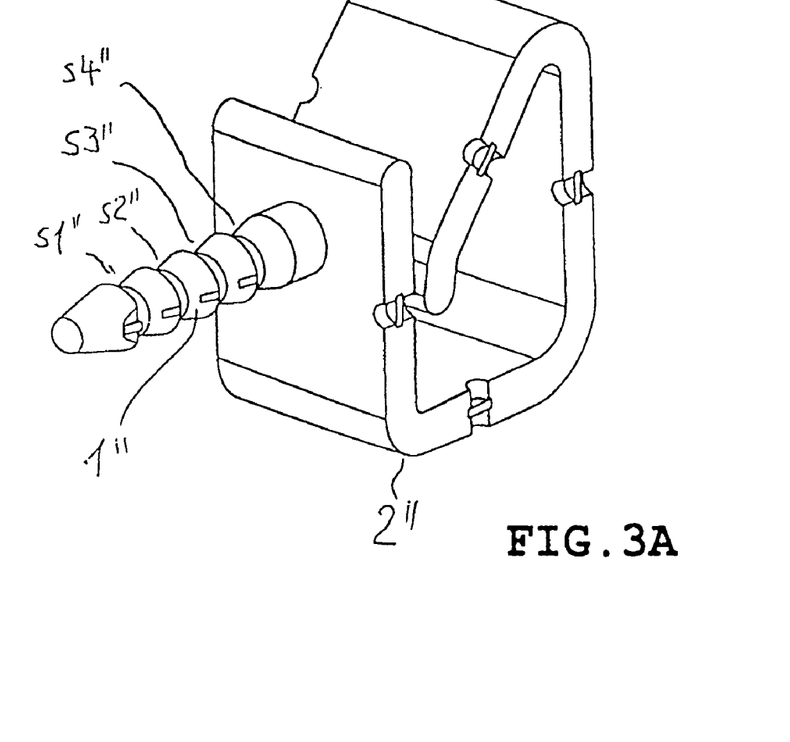

FIG. 3A shows a perspective view of the connection arrangement according to invention consisting of a pin 1" with a head-part arrangement 2" and a retaining disk (not shown) which can be connected with the end of the pin in an engaging position s1", s2", s3", s4".

Figure 3B:
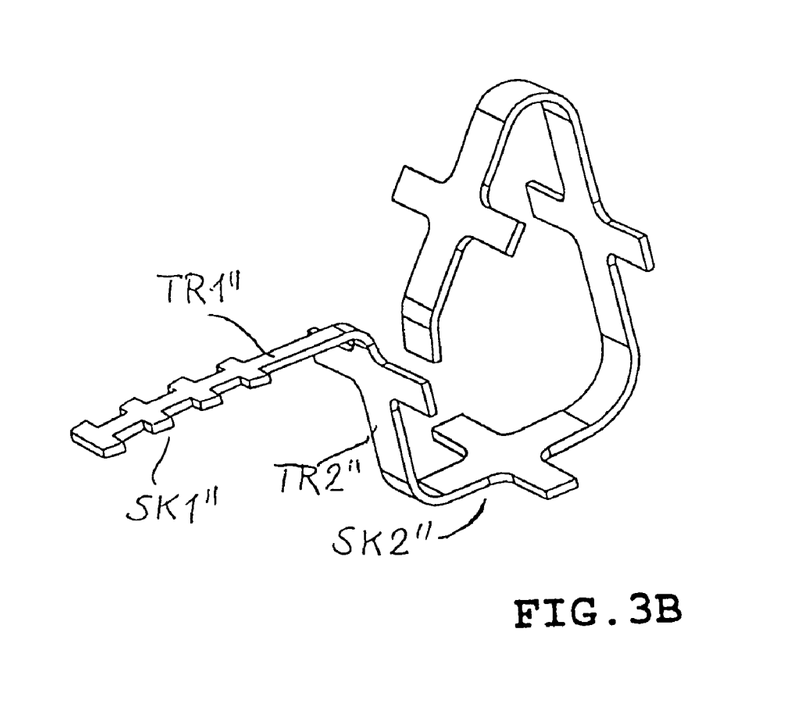

FIG. 3B shows a perspective view of the metal skeleton SK1" of the pin and the skeleton SK2" of the head-part arrangement.

The material layers (not shown for reasons of simplification) are arranged on pin 1" (similar to FIG. 1A) between the head-part arrangement 2" and the retaining disk. The head-part arrangement 2" may be used for attaching, holding or storing of objects or components and can be shaped in any way.

The pin skeleton SK1" is formed similarly to the pin skeleton SK1 in FIG. 1B. Its main shaft TR1" with projecting rungs is connected permanently with the main shaft TR2" of the skeleton SK2" of the head-part arrangement which also has rungs projecting to the side. These serve to stiffen the plastic coating of the head-part arrangement.

FIG. 4A shows a perspective view of a retaining disk 3 according to invention with three spring arms F1, F2 and F3 pointing inwards.

FIG. 4B shows

A perspective view of the metal skeleton SK3 of the retaining disk which is coated with plastic to form the shape shown in FIG. 4A. The skeleton SK3 of the retaining disk is made of spring steel.

The ends of the spring arms embrace, in the form of an arc of a circle (a1, a2 and a3 as indicated by the dotted arcs), an opening (op) through which the imaginary pin 1 (see FIG. 1A) or 1' (see FIG. 2A) or 1" (see FIG. 3A) can be pushed thereby causing the spring arms to yield resiliently.

To prevent the pin skeleton SK1, SK1' or SK1" from yielding into the slits s11/2, s12/3 or s13/1 between the spring arms (on destruction by fire of the plastic coating of the assembled arrangement according to FIG. 1A or FIG. 2A) the slits are as narrow as possible i.e. narrower than the thickness of the pin skeleton SK1, SK1' or SK1". They are also aligned in a certain way. In the vicinity of the opening the slits are aligned at a tangent to the opening op.

Should the pin skeleton have an angle profile, the retaining element may have the form of a retaining disk with a straight slit which separates two spring arms pointing towards the slit from one another.

The retaining and connecting arrangement according to invention goes beyond the examples described in connection with the figures. The skeleton parts do not have to be metal and the "plastic" coating does not have to be plastic. It is important that the skeleton material is more resistant to heat than the material surrounding the skeleton. Solutions are also conceivable where the skeleton is of ceramic material and the surrounding material a metal.

However, to meet the demands of aircraft construction, it is sufficient to use steel for the skeleton and plastic (especially polyamide) for the coating.

The invention is not confined to skeletons made of stampings from a flat metal sheet. More complex bodies may also be used as skeletons. Depending on the shape of the engaging positions on the pin, the retaining elements may have a completely different form than that of a retaining disk with spring arms pointing inwards.

In addition, the invention is not confined to the head arrangement shown in FIGS. 3A and 3B. The pin 1" may be connected to any head arrangement, regardless of its form. It must only be shaped in such a way that it forms a stop for the layer of material lying against it. Similarly, the invention is not confined to holding several layers of material together. It also applies for a single layer of material when (for example) a head arrangement is to be attached to only one layer of material.

The invention claimed is:

1. A connection arrangement including superimposed layers of material, characterised in that a pin (1; 1'; 1") is provided with a head part where said head part is a head (2) or a head arrangement (2"), and engaging positions (s1, s2, s3, s4; s1", s2", s3", s4") along part of the length of said pin for the attachment of a retaining element (3), where said pin is pushed through the layers of material (A, B) or a hole in the layers of material, and the layers of material are located between said head part and said retaining element, said pin includes a pin skeleton (SK1, SK1") coated with an outer material by moulding or injection moulding, said head part includes a head part skeleton where said head part skeleton is a head skeleton (SK2) or head-arrangement skeleton (SK2") coated with an outer material by moulding or injection moulding; and said retaining element (3) includes a retaining-element skeleton (SK3) coated with an outer material by moulding or injection moulding, where material of said pin skeleton, head part skeleton, and retaining-element skeleton is more resistant to heat than said outer material, said pin skeleton (SK1, SK1") has a main shaft (TR1, TR1') extending continuously over the length of said pin (1; 1'), with rungs (C1, C2, C3, C4, C5, C6, C7, C8) projecting laterally from said pin; said rungs have ends; said engaging positions (s1, s2, s3, s4; s1", s2", s3", s4") are formed between said ends of said rungs, said retaining element (3) engages an end of said pin and in an engaging position, said pin skeleton, said head part skeleton, and said retaining element skeleton are connected and remain connected following removal of said outer layer by burning or melting of said outer layer.

2. A connection arrangement according to claim 1 characterised in that at least one of the following:
said head part skeleton, said retaining element skeleton (SK3), or an outer surfaces (fa, fs) of said rungs is coated with said outer material at said engaging positions by moulding or injection moulding.

3. A connection arrangement according to claim 1 characterised in that
outer surfaces (fa, fs) of said rungs are not covered by an outer material at said engaging positions.

4. A connection arrangement according to claim 1, characterized in that
said head arrangement (2") includes an attaching structure, holding space for components, or storage space for objects.

5. A connection arrangement according to claim 1, characterised in that
said pin (1, 1', 1") has a saw-tooth contour in the imaginary lengthwise section, with engaging positions (s1, s2, . . . ; s1', s2', . . . ; s1", s2", . . .) formed by the gaps between said teeth.

6. A connection arrangement according to claim 5, characterised in that
said saw-tooth profile has rising and falling tooth flanks.

7. A connection arrangement according to claim 6, characterised in that
said rising tooth flanks on said pin rise towards said head part, or towards the other end of said pin and said falling tooth flanks run vertically to the axis of said pin.

8. A connection arrangement according to claim 1 characterised in that
said pin skeleton has an angle profile, and that said retaining element is a retaining disk with a straight slit which separates one spring arm from other two spring arms pointing towards said slit.

9. A connection arrangement according to claim 1, characterized in that
said outer material is plastic and said skeleton material is metal.

10. A connection arrangement according to claim 9, characterized in that
said plastic outer material is polyamide and said metal skeleton material is steel.

11. A connection arrangement including superimposed layers of material characterised in that
a pin (1') is provided with two free ends and length sections (x, y) assigned thereto, and with engaging positions (s1', s2', s3', s4'; s5', s6', s7') in both length sections, for the attachment of one retaining element (3, 3) to each, where said pin (1') is pushed through a plurality of material layers (C, D, E) or through a hole in the material layers, and said material layers are located on said pin between said two retaining elements (3, 3), said pin includes a pin skeleton (SK1') coated with an outer material (4) by moulding or injection moulding, said retaining element (3, 3) includes a retaining-element skeleton (SK1'), said pin skeleton and said retaining-element skeleton are made of a material more resistant to heat than said outer material,
that said pin skeleton (SK1') has a main skeleton shaft (TR1') extending continuously over the length of said pin (1'), with rungs (C1', C2', C3', C4', C5', C6', C7', C8'; C9', C10', C11', C12', C13', C14') projecting laterally from said pin said rungs have ends; said engaging positions (s1', s2', s3', s4'; s5', s6', s7') are formed between said ends of said rungs, that said retaining element (3) can be pushed onto each end of said pin and arranged in its engaging position, said skeleton pin and said retaining-element skeleton remain connected following burning or melting of said outer layer.

12. A connection arrangement according to claim 11, characterised in that
a flange (F') is located on said pin (1') between said sections (x, y) and that layers of material (C, D, E) can be arranged on said pin on both sides of said flange (F').

13. A connection arrangement according to claim 12, characterised in that
said pin (1') has supporting elements (H) projecting obliquely from said pin for holding at least one layer of material.

14. A connection arrangement according to claim 11, characterised in that
said pin skeleton (SK1, SK1', SK1") is a flat stamping.

15. A connection arrangement according to claim 14, characterised in that
said retaining element is a retaining disk (3) with at least three spring arms (F1, F2, F3) pointing towards the centre of said retaining disk.

16. A connection arrangement according to claim 15, characterised in that
said spring arms have ends, said ends of said spring arms embrace, in the form of an arc of a circle (a1, a2, a3), an opening (op) through which said pin (1, 1', 1") can be pushed thereby causing said spring arms to yield resiliently.

17. A connection arrangement according to claim 16, characterised in that
said spring arms adjacent to said opening (op) are separated by a slit (s11/2, s12/3, s13/1), where the width of said slit is less than the thickness of said pin skeleton.

18. A connection arrangement according to claim 17, characterised in that
each of said slits (s11/2, s12/3, s13/1) running towards said opening are aligned tangentially with said opening (op) in the vicinity of said opening (op).

19. A connection arrangement including a superimposed layer of material, characterized in that
a pin (1; 1'; 1") is provided with a head part where said head part is a head (2) or a head arrangement (2"), and engaging positions (S1, s2, s3, s4; s1", s2", s3", s4") along part of the length of said pin for the attachment of a retaining element (3), where said pin is pushed through said layer of material or a hole in said layer of material, and said layer of material is located between said head part and said retaining element, said pin includes
a pin skeleton (SK1, SK1") is coated with an outer material by moulding or injection moulding, said head part includes a head part skeleton where said head part skeleton is a head skeleton (SK2) or head-arrangement skeleton (SK2") coated with an outer material by moulding or injection moulding; and said retaining element (3) includes
a retaining-element skeleton (SK3) coated with an outer material by moulding or injection moulding, where the material of said pin skeleton, head part skeleton, and retaining-element skeleton is more resistant to heat than said outer material, said pin skeleton (SK1, SK1") has a main shaft (TR1, TR1') extending continuously over the length of said pin (1; 1'), with rungs (C1, C2, C3, C4, C5, C6, C7, C8) projecting laterally from said pin; said rungs have ends; said engaging positions (s1, s2, s3, s4; s1", s2", s3", s4") are formed between said ends of said rungs, said retaining element (3) engages an end of said pin and in an engaging position, said pin skeleton, said head part skeleton, and said retaining element skeleton are connected and remain connected following removal of said outer layer by burning or melting of said outer layer.

* * * * *